United States Patent
Gretz

(10) Patent No.: US 6,268,563 B1
(45) Date of Patent: Jul. 31, 2001

(54) FLUSH-MOUNT ELECTRICAL JUNCTION BOX

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 09/373,429

(22) Filed: Aug. 13, 1999

Related U.S. Application Data

(63) Continuation-in-part of application No. 09/002,575, filed on Jan. 3, 1998.

(51) Int. Cl.⁷ ........................................ H01H 9/02
(52) U.S. Cl. ..................... 174/53; 174/57; 52/220.8; 439/535
(58) Field of Search ..................... 174/53, 57, 50, 174/65 R; 220/3.2, 3.3, 4.02; 52/60, 220.8; 248/906, 220.2; 439/535

(56) References Cited

U.S. PATENT DOCUMENTS

| | | | |
|---|---|---|---|
| 3,299,199 | * | 1/1967 | Mattingly ............................ 174/50 |
| 3,983,311 | * | 9/1976 | Brumfield et al. ................ 220/3.8 X |
| 5,326,060 | * | 7/1994 | Chubb et al. ...................... 248/231.9 |
| 5,549,266 | * | 8/1996 | Mitchell et al. ................... 248/205.1 |
| 5,646,371 | * | 7/1997 | Fabian ..................................... 174/58 |
| 5,722,208 | * | 3/1998 | Humphrey et al. ................. 52/220.8 |
| 5,866,845 | * | 2/1999 | Markiewicz et al. .................. 174/57 |
| 5,934,935 | * | 8/1999 | Kamaeyama .......................... 439/535 |
| 6,051,786 | * | 4/2000 | Gretz ..................................... 174/57 |

* cited by examiner

Primary Examiner—Dean A. Reichard
Assistant Examiner—Adolfo Nino

(57) ABSTRACT

The unitary flush mount electrical junction box of the present invention includes about its periphery a pair of axially extending flanges, an interior and an exterior flange, separated by a gap adequate to receive siding applied to the structure in which it is installed. The interior flange while adequate for resistance to water permeation is scored for easy removal in the situation where the electrical junction box is being installed in an existing sided structure and it is necessary to install the junction box through the existing siding. In order to accomplish attachment with the interior flange removed, apertures are provided in the rear of the junction box for insertion of fasteners appropriate to attach the junction box to the structure. The electrical junction box extends beyond the plane of the exterior flange to permit attachment of a variety of electrical fixtures or devices thereto.

8 Claims, 4 Drawing Sheets

FLUSH-MOUNT ELECTRICAL JUNCTION BOX

This application is a continuation-in-part of U.S. patent application Ser. No. 09/002,575, filed Jan. 3, 1998.

FIELD OF THE INVENTION

The present invention relates to devices used in the mounting of electrical and communications components and the like on structures, and more specifically to unitary or one-piece such devices suitable for mounting on the exterior of structures covered with siding.

BACKGROUND OF THE INVENTION

In the mounting of electrical fixtures, receptacles, switches and the like in the interior of buildings, it is common practice to mount electrical junction boxes to ceiling joists, wall studs or other members of the building's structure. When mounting such devices on the exterior of a building or structure, particularly one that is covered or to be covered with siding of one type or another, it is significantly more difficult to obtain a secure mounting location that also provides an esthetically pleasing or at least acceptable appearance.

A large number of devices have been suggested to obtain an acceptable electrical junction box for installation on the exterior of a building. Such electrical junction boxes are commonly referred to as "flush-mount" boxes because they give the appearance of being attached to the surface of the building and do not require attachment to a stud or other building frame member and yet they are secure and esthetically acceptable.

U.S. Pat. No. 5,549,266 to Mitchell et al describes a two-part exterior mounting bracket that includes a back plate that incorporates a deflecting strip to inhibit the penetration of water behind the siding of the structure. Successful use of this device requires its careful location with respect to the over-applied siding to insure that the deflecting strip does not interfere with the proper installation of the siding.

U.S. Pat. No. 5,326,060 to Chubb et al describes a one-piece plastic building wall mount assembly for the installation of electrical receptacles and the like on the exterior surface of a building. The device comprises a one-piece bracket with a back wall and an integral continues peripheral wall extending axially therefrom, a flange member having an outside flange and an integral flange wall extending axially therefrom to be received by the mounting bracket so that only the flange member is visible from the outside of the building. This device offers significant risk of water permeation about the periphery of the integral flange wall after installation and is therefor not entirely satisfactory.

U.S. Pat. No. 5,722,208 to Humphrey et al describes a wall mount system for electrical devices comprising a one or two-piece wall mounting frame with an integrally molded electrical junction box which is flush mounted on the exterior of a building. The devices described in this patent include a narrowed gap between an interior flange and an exterior flange to allow proper fit with siding while maintaining the required depth of the electrical junction box. Although this approach is superior to many other such devices, the presence of the interior flange as a permanent part of the device requires cutting a very large hole in the siding to accommodate the interior flange when a retrofit installation is attempted.

OBJECT OF THE INVENTION

It is therefor an object of the present invention to provide an improved flush-mount electrical junction box that is both water-resistant and easily and acceptably installed in both new and retrofit construction.

SUMMARY OF THE INVENTION

The unitary or one-piece flush-mount electrical junction box of the present invention includes about its periphery a pair of axially extending flanges, an interior and an exterior flange, separated by a gap adequate to receive siding applied to the structure in which it is installed. The interior flange while adequate for resistance to water permeation is scored for easy removal in the situation where the electrical junction box is being installed in an existing sided structure and it is necessary to install the junction box through the existing siding. In order to accomplish attachment with the interior flange removed, apertures are provided in the rear of the junction box for insertion of fasteners appropriate to attach the junction box to the structure. The electrical junction box extends beyond the plane of the exterior flange to permit attachment of a variety of electrical fixtures or devices thereto.

DETAILED DESCRIPTION

The ability of a flush-mount electrical junction box to conveniently and esthetically adapt to the presence of siding on a building is very important in both new and retrofit construction. Concurrently, the flush-mount electrical junction box must be designed such that it resists penetration by water in its installed configuration. Finally, for the installer, flush-mount electrical junction boxes should be adaptable to both new and retrofit construction without the need for any significant modification.

Figure 1:
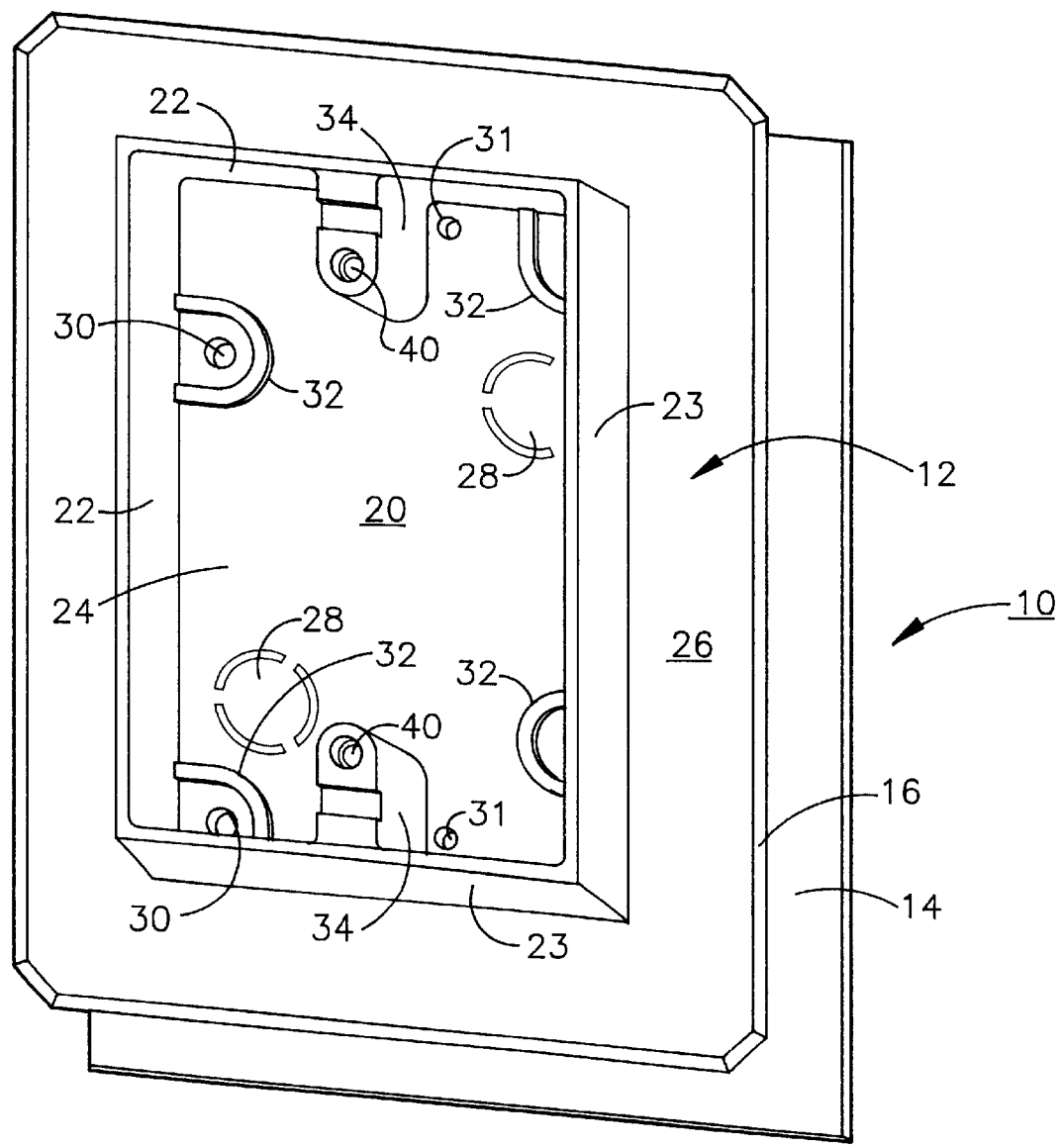
FIG. 1 is a perspective view of the flush-mount electrical junction box of the present invention.
Figure 2:
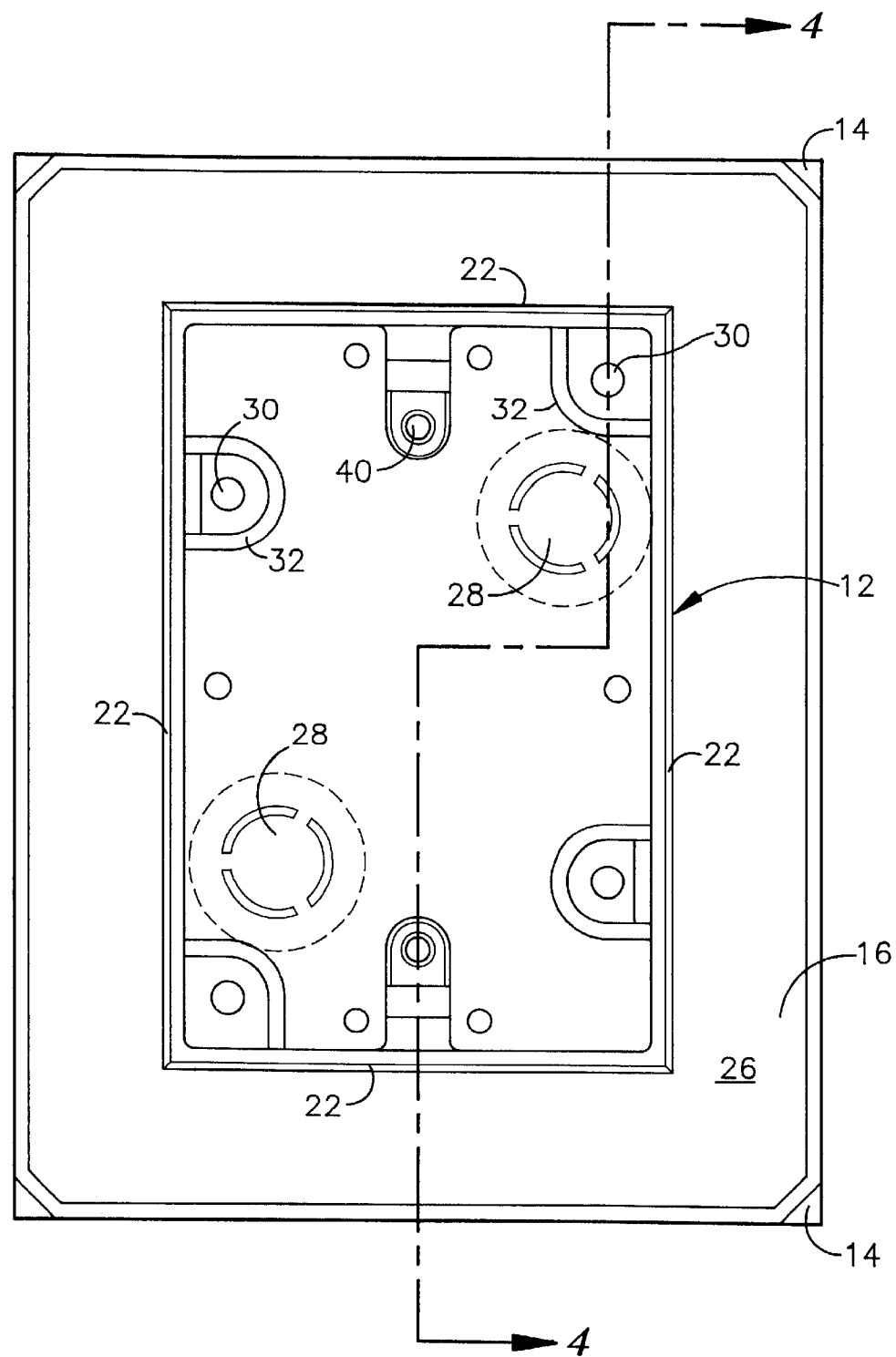
FIG. 2 is a front view of the flush-mount electrical junction box of the present invention.
Figure 3:
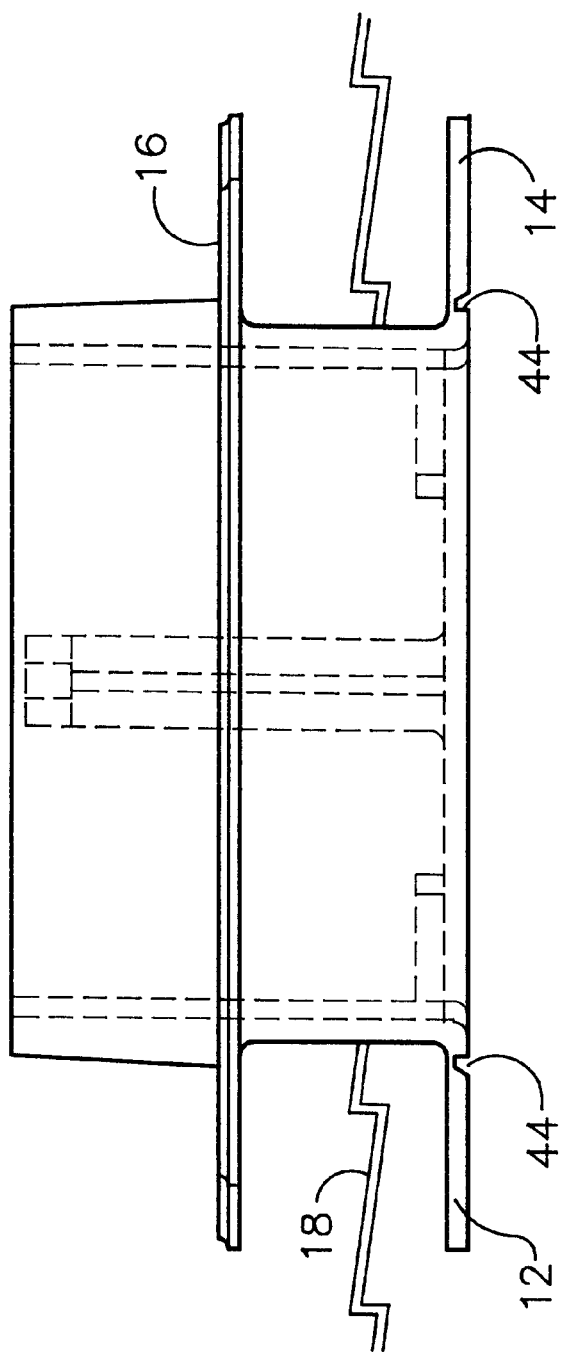
FIG. 3 is a top view of the flush-mount electrical junction box of the present invention in an installed configuration.

As shown in FIG. 1, the electrical junction box 10 of the present invention comprises a central electrical box 12 having a pair of flanges, interior flange 14 and exterior flange 16, extending axially or orthogonally therefrom and about its periphery. Interior flange 14 is preferably generally coplanar with the outer surface of rear wall 20 of electrical box 12. As best shown in FIG. 3, flanges 14 and 16 are separated sufficiently to permit easy reception of surrounding siding 18. Electrical box 12 includes a rear wall 20, sidewalls 22 and an open face 24. Side walls 22 extend forward from rear wall 20 beyond surface 26 of exterior flange 16 and have exterior walls 23 that are preferably angled inward, i.e. they are narrower at open face 24 than at surface 26, to provide an integral moisture resistant system. Typically, the angle of walls 22 is about 3° from orthogonal with surface 26 as shown in FIG. 3. Whether walls 23 are angled or not, open face 24 is of a size to receive an overlying fixture or plate of conventional design as described below. Electrical box 12 further includes knock-outs 28 and fastener apertures 30 for insertion of appropriate wiring and fasteners such as screws or nails 25 to attach flush-mount electrical junction box 10 to the structure as shown, for example, in FIG. 1. According to a preferred embodiment of the present invention, fastener apertures 30 have reinforcing ridges 32 in the area of their periphery for purposes of strengthening this high stress area of electrical box 12 when a heavy light or other fixture is attached to flush-mount electrical junction box 10. Furthermore, it is further preferred that knockouts 28 are recessed and include or are capable of receiving low profile connectors, not shown.

Figure 4:
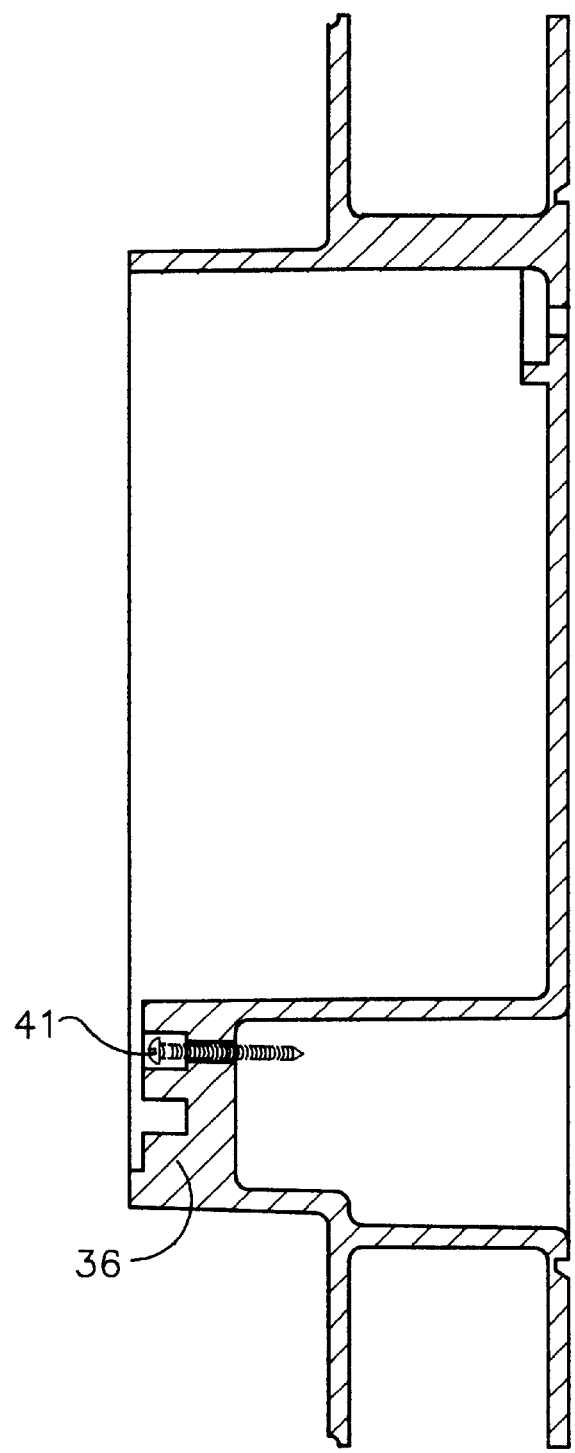
FIG. 4 is a cross-sectional view along the line 4—4 of FIG. 2.

In order to permit attachment of an appropriate switch, outlet or electrical fixture to flush-mount electrical junction box 10 mounting blocks 34 are included. As best shown in FIG. 4, mounting blocks 34 comprise a base portion 36 having an aperture 38 that preferably includes an enlarged recess 40 at the top thereof for receiving a fixture or other device mounting screw 41. Aperture 38 is of a size to receive and frictionally retain appropriate fixture mounting screw 41. For purposes of providing the required strength when a heavy fixture is attached to flush-mount electrical junction box 10, mounting blocks 34 preferably include an integrally formed reinforcing extension 42 that extends rearward to and is integrally formed with rear wall 20.

Exterior flange 16 may be of any geometrical shape or design, but it is preferred that it be of a size and shape to esthetically adapt to the particular installation. For example, exterior flange 16 will be larger for flush-mount electrical junction boxes intended for mounting electrical light fixtures than those suitable for mounting an electrical outlet or switch. Also, although not critical to the successful practice of the present invention, it is preferred that exterior flange 16 be at least slightly larger in area than interior flange 14 to assure that any exposure of the hole in the siding through which flush-mount electrical junction box 10 has been inserted is adequately covered.

An important element of flush-mount electrical junction box 10 and one that clearly distinguishes it from those of the prior art, is the incorporation of "score" line 44 in interior flange 14 about the periphery of electrical box 12. "Score" or "scoring" as used herein is meant to define a thinning or weakening of the material of interior flange 14 by any means and not literally scoring of the material with a knife or the like. In a preferred embodiment, the score is provided in the injection molding process and results in a thinning of the flange material in the area indicated about the periphery of electrical box 12.

In those retrofit installations wherein access to the underlying sheathing or other supporting material for attachment of flush-mount electrical junction box 10 is through preexisting siding material, rear flange 14 is removed by bending along score line 44 about all sides of electrical box 20 thereby permitting insertion of flush-mount electrical junction box 10 into a much smaller hole in the siding than would be possible with a fully intact interior flange 14.

The distance between interior flange 14 and exterior flange 16 is not of particularly critical importance so long as this distance is adequate to permit reception of siding 18 therein. Generally a gap of about 1 inch or slightly less has been found adequate for most installations. Custom designed shapes and thicknesses for particular siding materials and configurations may, of course, also be provided.

For reasons of ease and cost of manufacture, it is preferred that the flush-mount electrical junction box of the present invention be fabricated from a plastic or polymeric material such as polyvinyl chloride by a process such as injection molding. This process provides a rapid and efficient process and produces an integral device that, when properly installed, is highly resistant to water penetration.

While the flush-mount electrical junction box of the present invention has been depicted in the various Figures as being rectangular, it should be obvious to the skilled artisan that round, hexagonal or otherwise shaped electrical boxes may also be considered within the scope of the invention.

As the invention has been described, it will be apparent to those skilled in the art that the same may be varied in many ways without departing from the spirit and scope thereof. Any and all such modifications are intended to be included within the scope of the appended claims.

What is claimed is:

1. A flush-mount electrical junction box comprising:
   a) an electrical box having a rear wall, side walls and an open face;
   b) an axially extending interior flange about said rear wall and having a score line adjacent to and about the periphery of said rear wall;
   c) an axially extending exterior flange parallel to said interior flange about the periphery of said side walls, between said rear wall and said open face and spaced a distance from said interior flange to provide a gap between said interior flange and said exterior flange, said gap being adequate to receive siding when said flush-mount electrical junction box is installed on a structure having siding.

2. The unitary flush-mount electrical junction box of claim 1 wherein said interior flange is substantially coplanar with said rear wall and includes said score line about said side wall.

3. The unitary flush-mount electrical junction box of claim 2 further including apertures in said rear wall for insertion of fasteners for attaching said flush-mount electrical junction box to said structure.

4. The unitary flush mount electrical junction box of claim 3 further including reinforcing ribs about the periphery of said apertures.

5. The unitary flush mount electrical junction box of claim 3 wherein said side walls have an interior surface and further including mounting blocks on at least two of said interior surfaces, said mounting blocks comprising a base member attached to or forming part of said interior surface, said base member having an aperture therein for frictional receipt of a screw for attachment of an electrical plate or fixture over said open face.

6. The unitary flush mount electrical junction box of claim 5 wherein said base extends from said open face to said rear wall.

7. The unitary flush mount electrical junction box of claim 3 wherein said side walls extend from said rear wall to and beyond said exterior flange, said side walls have an outer surface and said outer surface angles inwardly from said exterior flange to said open end.

8. The unitary flush mount electrical junction box of claim 2 fabricated from a polymeric material as a one-piece molded assembly.

* * * * *